United States Patent
Zhang et al.

(10) Patent No.: US 12,542,450 B2
(45) Date of Patent: Feb. 3, 2026

(54) METHOD AND SYSTEM FOR CHARGING A BATTERY

(71) Applicant: GM GLOBAL TECHNOLOGY OPERATIONS LLC, Detroit, MI (US)

(72) Inventors: Han Zhang, Shelby Township, MI (US); Taylor R. Garrick, Bloomfield, MI (US); Brian J. Koch, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 716 days.

(21) Appl. No.: 17/894,691

(22) Filed: Aug. 24, 2022

(65) Prior Publication Data

US 2024/0072565 A1 Feb. 29, 2024

(51) Int. Cl.
*H02J 7/00* (2006.01)
*H01M 10/44* (2006.01)
*H01M 10/48* (2006.01)

(52) U.S. Cl.
CPC ..... *H02J 7/007194* (2020.01); *H01M 10/443* (2013.01); *H01M 10/486* (2013.01); *H01M 2220/20* (2013.01)

(58) Field of Classification Search
CPC . G01K 13/00; G01R 31/3835; H01M 10/443; H01M 10/486; H01M 2220/20; H01M 10/44; H02J 7/007194; H02J 7/00036; H02J 7/0047; H02J 7/007182
USPC .......................................................... 320/150
See application file for complete search history.

(56) References Cited

U.S. PATENT DOCUMENTS

| | | | | |
|---|---|---|---|---|
| 2,578,027 A | * | 12/1951 | Tichenor | H02J 7/00302 320/147 |
| 4,583,034 A | * | 4/1986 | Martin | H02J 7/00714 320/DIG. 20 |
| 5,498,493 A | * | 3/1996 | Dahn | H01M 4/587 429/231.1 |
| 5,601,951 A | * | 2/1997 | Johnson | H01M 10/0563 429/105 |
| 5,729,116 A | * | 3/1998 | Tsenter | H02J 7/00711 320/155 |

(Continued)

OTHER PUBLICATIONS

Taylor R. Garrick et al., "Modeling Electrochemical Transport within a Three-Electrode System", Journal of the Electrochemical Society, 2021 J. Electrochem. Soc. 168 010530, 13 pages.

*Primary Examiner* — Drew A Dunn
*Assistant Examiner* — Frank Alexis Silva
(74) *Attorney, Agent, or Firm* — Quinn IP Law

(57) ABSTRACT

A battery charging system includes a charger that is dynamically controlled during charging, including during rapid charging events that include elevated voltage and/or elevated current levels. The charger is connectable to a battery cell of a rechargeable energy storage system. Operation includes transferring electric power having a charging current at a maximum charging rate to the battery cell. An anode potential offset setpoint is determined. A predicted anode potential offset is determined at an interface between the anode and the separator based upon the cell voltage for the battery cell. The charger is controlled to transfer the electric power to the battery cell based upon a temperature distribution in the battery cell and a difference between the anode potential offset setpoint and the predicted anode potential offset.

20 Claims, 4 Drawing Sheets

(56) References Cited

U.S. PATENT DOCUMENTS

| | | | | |
|---|---|---|---|---|
| 6,336,063 B1* | 1/2002 | Lennevi | ............... | B60W 20/00 |
| | | | | 903/910 |
| 6,664,765 B2* | 12/2003 | Dotzler | ............... | H02J 7/0071 |
| | | | | 320/152 |
| 6,859,014 B2* | 2/2005 | Bohne | ............... | H02J 7/0071 |
| | | | | 320/148 |
| 7,598,709 B2* | 10/2009 | Guang | ............... | H02J 7/00712 |
| | | | | 320/135 |
| 7,626,362 B2* | 12/2009 | Guang | ............... | H02J 7/007182 |
| | | | | 320/135 |
| 7,683,570 B2* | 3/2010 | Krauer | ............... | H01M 10/6571 |
| | | | | 180/65.29 |
| 7,898,220 B2* | 3/2011 | Guang | ............... | H02J 7/00712 |
| | | | | 320/135 |
| 8,539,408 B1* | 9/2013 | Cheng | ............... | G06F 30/367 |
| | | | | 716/110 |
| 8,552,693 B2* | 10/2013 | Paryani | ............... | H02J 7/007194 |
| | | | | 320/152 |
| 8,754,611 B2* | 6/2014 | Greening | ............... | H02J 7/007 |
| | | | | 429/61 |
| 8,854,012 B2* | 10/2014 | Dai | ............... | H02J 7/007182 |
| | | | | 320/134 |
| 8,970,182 B2* | 3/2015 | Paryani | ............... | H02J 7/00 |
| | | | | 320/160 |
| 9,013,139 B2* | 4/2015 | Pinnell | ............... | H02J 7/00041 |
| | | | | 320/106 |
| 9,071,071 B2* | 6/2015 | Greening | ............... | H01M 10/44 |
| 9,196,930 B2* | 11/2015 | Chorian | ............... | H01M 50/581 |
| 9,331,513 B2* | 5/2016 | Greening | ............... | H01M 10/44 |
| 9,331,520 B2* | 5/2016 | Terry | ............... | H02J 7/00714 |
| 9,643,510 B2* | 5/2017 | Liu | ............... | H02J 7/00 |
| 9,698,451 B2* | 7/2017 | Bhardwaj | ............... | H01M 10/425 |
| 9,882,196 B2* | 1/2018 | Eaglesham | ............... | H01M 4/381 |
| 9,966,769 B2* | 5/2018 | Srinivasan | ............... | H01M 10/482 |
| 10,035,426 B2* | 7/2018 | Lee | ............... | H01M 10/4207 |
| 10,038,326 B2* | 7/2018 | Chen | ............... | H02J 7/007194 |
| 10,044,017 B2* | 8/2018 | Sawamoto | ............... | H01M 50/423 |
| 10,044,210 B2* | 8/2018 | Greening | ............... | H02J 7/007 |
| 10,044,213 B2* | 8/2018 | Barsukov | ............... | H02J 7/00 |
| 10,135,279 B2* | 11/2018 | Luo | ............... | H02J 7/00 |
| 10,137,792 B2* | 11/2018 | He | ............... | B60L 58/14 |
| 10,224,744 B2* | 3/2019 | Terry | ............... | H02J 50/10 |
| 10,236,493 B2* | 3/2019 | Eaglesham | ............... | H01M 4/381 |
| 10,250,052 B2* | 4/2019 | Patil | ............... | H02J 7/0071 |
| 10,446,883 B2* | 10/2019 | Spigno | ............... | H01M 4/661 |
| 10,481,623 B1* | 11/2019 | Forouzan | ............... | G05B 13/048 |
| 10,553,915 B1* | 2/2020 | Li | ............... | H02J 7/00714 |
| 10,556,510 B2* | 2/2020 | Yazami | ............... | H01M 10/486 |
| 10,566,819 B2* | 2/2020 | Barsukov | ............... | H02J 7/00 |
| 10,574,075 B2* | 2/2020 | Gekinozu | ............... | H02J 1/102 |
| 10,608,234 B2* | 3/2020 | Eaglesham | ............... | H01M 10/0445 |
| 10,608,235 B2* | 3/2020 | Doe | ............... | H01M 4/58 |
| 10,700,376 B2* | 6/2020 | Koch | ............... | H01M 10/44 |
| 10,725,112 B1* | 7/2020 | Jung | ............... | G01R 31/3835 |
| 10,727,545 B1* | 7/2020 | Gan | ............... | H02J 7/0013 |
| 10,800,284 B2* | 10/2020 | He | ............... | H01M 10/0525 |
| 10,892,631 B2* | 1/2021 | Barsukov | ............... | H02J 7/00 |
| 10,992,177 B2* | 4/2021 | Terry | ............... | H02J 7/00 |
| 11,159,039 B2* | 10/2021 | Matsumura | ............... | H02J 7/0047 |
| 11,173,775 B2* | 11/2021 | He | ............... | B60W 10/06 |
| 11,201,500 B2* | 12/2021 | Partovi | ............... | H02J 7/00041 |
| 11,316,371 B1* | 4/2022 | Partovi | ............... | G06F 1/1635 |
| 11,411,433 B2* | 8/2022 | Partovi | ............... | H02J 50/10 |
| 11,462,942 B2* | 10/2022 | Partovi | ............... | H02J 50/12 |
| 11,469,445 B2* | 10/2022 | Li | ............... | H01M 4/131 |
| 11,557,797 B2* | 1/2023 | Surampudi | ............... | H01M 10/425 |
| 11,568,102 B2* | 1/2023 | Miyamoto | ............... | H01M 50/264 |
| 11,588,178 B2* | 2/2023 | Li | ............... | H01M 10/0562 |
| 11,695,283 B2* | 7/2023 | El Markhi | ............... | H02J 7/0031 |
| | | | | 320/137 |
| 11,718,529 B1* | 8/2023 | Paronyan | ............... | B01J 21/18 |
| | | | | 429/231.8 |
| 11,764,399 B1* | 9/2023 | Li | ............... | H01M 4/405 |
| | | | | 429/304 |
| 11,837,906 B2* | 12/2023 | Terry | ............... | H02J 50/10 |
| 11,909,247 B2* | 2/2024 | Uchinohae | ............... | H02J 7/00036 |
| 12,164,837 B2* | 12/2024 | Grant | ............... | H01M 4/621 |
| 12,224,616 B1* | 2/2025 | Yavas | ............... | B60L 53/68 |
| 12,228,615 B2* | 2/2025 | Kim | ............... | G01R 31/382 |
| 12,237,708 B2* | 2/2025 | Choe | ............... | H02J 7/007182 |
| 12,255,486 B2* | 3/2025 | Schmidt | ............... | H02J 7/00711 |
| 12,341,372 B2* | 6/2025 | Janek | ............... | B60L 53/62 |
| 12,362,588 B1* | 7/2025 | Yavas | ............... | B60L 53/68 |
| 2006/0022646 A1* | 2/2006 | Moore | ............... | H02J 7/0029 |
| | | | | 320/150 |
| 2006/0093894 A1* | 5/2006 | Scott | ............... | H01M 10/44 |
| | | | | 429/231.1 |
| 2007/0075682 A1* | 4/2007 | Guang | ............... | H02J 7/007182 |
| | | | | 320/128 |
| 2007/0182418 A1* | 8/2007 | Reynier | ............... | H01M 6/50 |
| | | | | 324/429 |
| 2008/0024090 A1* | 1/2008 | Guang | ............... | H02J 7/007182 |
| | | | | 320/148 |
| 2009/0256528 A1* | 10/2009 | Greening | ............... | H01M 10/443 |
| | | | | 429/61 |
| 2009/0259420 A1* | 10/2009 | Greening | ............... | H01M 10/0566 |
| | | | | 320/152 |
| 2010/0033137 A1* | 2/2010 | Guang | ............... | H02J 7/00712 |
| | | | | 320/148 |
| 2010/0200403 A1* | 8/2010 | Lopatin | ............... | H01G 11/26 |
| | | | | 204/474 |
| 2011/0012563 A1* | 1/2011 | Paryani | ............... | H01M 10/0525 |
| | | | | 320/162 |
| 2011/0081577 A1* | 4/2011 | Gozdz | ............... | H01M 4/13 |
| | | | | 429/223 |
| 2011/0156661 A1* | 6/2011 | Mehta | ............... | H02J 7/0071 |
| | | | | 320/160 |
| 2011/0250478 A1* | 10/2011 | Timmons | ............... | H01M 4/587 |
| | | | | 429/91 |
| 2012/0231308 A1* | 9/2012 | Chiang | ............... | H01M 4/485 |
| | | | | 429/231.95 |
| 2013/0119921 A1* | 5/2013 | Choe | ............... | H01M 10/48 |
| | | | | 320/106 |
| 2013/0162200 A1* | 6/2013 | Terry | ............... | H04B 5/24 |
| | | | | 320/108 |
| 2013/0162216 A1* | 6/2013 | Zhamu | ............... | H01G 11/32 |
| | | | | 320/130 |
| 2014/0008976 A1* | 1/2014 | Yebka | ............... | H01M 10/0525 |
| | | | | 307/23 |
| 2014/0023888 A1* | 1/2014 | Fulop | ............... | H02J 7/0068 |
| | | | | 429/50 |
| 2014/0197805 A1* | 7/2014 | Greening | ............... | H01M 10/0525 |
| | | | | 320/162 |
| 2014/0242445 A1* | 8/2014 | Gozdz | ............... | H01M 10/0525 |
| | | | | 429/158 |
| 2014/0253023 A1* | 9/2014 | Paryani | ............... | H01M 10/44 |
| | | | | 320/160 |
| 2014/0272481 A1* | 9/2014 | Chung | ............... | H01M 50/121 |
| | | | | 429/103 |
| 2014/0329155 A1* | 11/2014 | Sawamoto | ............... | H01M 50/423 |
| | | | | 429/254 |
| 2015/0077057 A1* | 3/2015 | Kelty | ............... | B60L 1/02 |
| | | | | 320/109 |
| 2015/0111077 A1* | 4/2015 | Paik | ............... | H01M 10/0525 |
| | | | | 205/59 |
| 2015/0147614 A1* | 5/2015 | Wang | ............... | G01R 31/3835 |
| | | | | 429/93 |
| 2015/0171455 A1* | 6/2015 | Mills | ............... | H01M 8/0656 |
| | | | | 429/422 |
| 2016/0006081 A1* | 1/2016 | Eaglesham | ............... | H01M 10/48 |
| | | | | 429/61 |
| 2016/0013462 A1* | 1/2016 | Cui | ............... | H01M 4/666 |
| | | | | 429/126 |
| 2016/0023566 A1* | 1/2016 | Lee | ............... | B60L 58/12 |
| | | | | 429/61 |
| 2016/0023567 A1* | 1/2016 | Lee | ............... | B60L 50/66 |
| | | | | 320/136 |

(56) References Cited

U.S. PATENT DOCUMENTS

| | | | |
|---|---|---|---|
| 2016/0023568 A1* | 1/2016 | Lee | B60L 58/12 429/61 |
| 2016/0023569 A1* | 1/2016 | Lee | B60L 58/12 429/61 |
| 2016/0087461 A1* | 3/2016 | Greening | H01M 50/00 320/107 |
| 2016/0111727 A1* | 4/2016 | Li | H01L 4/667 429/231.5 |
| 2016/0126532 A1* | 5/2016 | Eaglesham | G01R 31/36 29/623.5 |
| 2016/0146895 A1* | 5/2016 | Yazami | H01M 10/486 324/426 |
| 2016/0276844 A1* | 9/2016 | Gekinozu | H02J 1/14 |
| 2016/0301244 A1* | 10/2016 | Terry | H02J 50/10 |
| 2017/0033572 A1* | 2/2017 | Becker | G01R 31/396 |
| 2017/0070061 A1* | 3/2017 | Barsukov | H02J 7/00 |
| 2017/0149256 A1* | 5/2017 | Srinivasan | H02J 7/00712 |
| 2017/0203660 A1* | 7/2017 | He | B60L 58/14 |
| 2017/0203667 A1* | 7/2017 | He | B60L 58/21 |
| 2017/0214054 A1* | 7/2017 | Cui | H01M 50/46 |
| 2017/0222447 A1* | 8/2017 | Ravi | H01M 10/48 |
| 2017/0244261 A1* | 8/2017 | Chen | H02J 7/0013 |
| 2017/0259686 A1* | 9/2017 | Lee | H01M 10/441 |
| 2017/0259689 A1* | 9/2017 | Lee | H01M 10/48 |
| 2017/0338666 A1* | 11/2017 | Christensen | G01R 31/392 |
| 2017/0358933 A1* | 12/2017 | Becker | H01M 10/633 |
| 2017/0366015 A1* | 12/2017 | Luo | H01M 10/44 |
| 2018/0062214 A1* | 3/2018 | Smith | H01M 10/4242 |
| 2018/0102532 A1* | 4/2018 | Fischer | H01M 4/0445 |
| 2018/0108956 A1* | 4/2018 | Fortenbacher | H01M 10/654 |
| 2018/0114971 A1* | 4/2018 | Eaglesham | H01M 4/5815 |
| 2018/0114972 A1* | 4/2018 | Doe | H01M 10/058 |
| 2018/0292461 A1* | 10/2018 | Kim | H02J 7/00 |
| 2019/0006871 A1* | 1/2019 | Barsukov | H02J 7/00 |
| 2019/0031035 A1* | 1/2019 | Koch | H01M 10/0525 |
| 2019/0044193 A1* | 2/2019 | Drews | H01M 10/0525 |
| 2019/0088971 A1* | 3/2019 | Koplow | H01M 8/188 |
| 2019/0214850 A1* | 7/2019 | Terry | H02J 7/00 |
| 2019/0267661 A1* | 8/2019 | Han | H01M 10/058 |
| 2019/0280345 A1* | 9/2019 | Spigno | H01M 4/661 |
| 2020/0136173 A1* | 4/2020 | Hong | H01M 10/0525 |
| 2020/0144833 A1* | 5/2020 | Barsukov | H02J 7/00712 |
| 2020/0161654 A1* | 5/2020 | Masarapu | H01M 4/38 |
| 2020/0210541 A1* | 7/2020 | Han | H01M 10/4207 |
| 2020/0313160 A1* | 10/2020 | Masarapu | H01M 4/134 |
| 2020/0321651 A1* | 10/2020 | Campbell | B60L 58/22 |
| 2020/0343582 A1* | 10/2020 | Li | H01M 10/44 |
| 2020/0343583 A1* | 10/2020 | Li | H01M 10/0562 |
| 2020/0363475 A1* | 11/2020 | Han | H01M 10/0525 |
| 2020/0371161 A1* | 11/2020 | Gorlin | H01M 10/446 |
| 2020/0412153 A1* | 12/2020 | Matsumura | H02J 7/0031 |
| 2021/0013731 A1* | 1/2021 | Choe | H01M 10/44 |
| 2021/0126243 A1* | 4/2021 | Lanning | H01M 10/0565 |
| 2021/0126244 A1* | 4/2021 | Gazda | H01M 4/134 |
| 2021/0126286 A1* | 4/2021 | Rogojina | H01M 4/583 |
| 2021/0126287 A1* | 4/2021 | Rogojina | H01M 4/136 |
| 2021/0135228 A1* | 5/2021 | Archer | H01M 4/1395 |
| 2021/0157959 A1* | 5/2021 | Miyamoto | H01M 50/249 |
| 2021/0167394 A1* | 6/2021 | Archer | H01M 10/0568 |
| 2021/0210981 A1* | 7/2021 | Terry | H02J 50/10 |
| 2021/0273228 A1* | 9/2021 | Hashim | H01M 4/525 |
| 2021/0359347 A1* | 11/2021 | Stefanopoulou | H01M 10/0525 |
| 2021/0376310 A1* | 12/2021 | Dasgupta | C23C 16/45529 |
| 2022/0029209 A1* | 1/2022 | Konopka | H02J 7/04 |
| 2022/0069361 A1* | 3/2022 | Surampudi | H02J 7/00712 |
| 2022/0118880 A1* | 4/2022 | Hermann | H02J 7/342 |
| 2022/0181911 A1* | 6/2022 | Partovi | H02J 7/0047 |
| 2022/0209219 A1* | 6/2022 | Lopez | H01M 4/134 |
| 2022/0276311 A1* | 9/2022 | Okabe | G01R 31/392 |
| 2022/0285988 A1* | 9/2022 | Partovi | H02J 50/05 |
| 2022/0320581 A1* | 10/2022 | Li | H01M 10/0562 |
| 2022/0384778 A1* | 12/2022 | Amiruddin | C01G 53/50 |
| 2022/0393231 A1* | 12/2022 | Li | H01M 4/405 |
| 2023/0067032 A1* | 3/2023 | Bell | H01M 4/382 |
| 2023/0117608 A1* | 4/2023 | Fuhrmann | G01R 31/392 324/426 |
| 2023/0160965 A1* | 5/2023 | Kim | H01M 10/482 702/63 |
| 2023/0191943 A1* | 6/2023 | Jin | H01M 10/44 320/109 |
| 2023/0207864 A1* | 6/2023 | Yushin | H01M 4/382 429/231.95 |
| 2023/0246254 A1* | 8/2023 | Huang | H01M 10/425 320/132 |
| 2023/0296684 A1* | 9/2023 | Stefanopoulou | G01R 31/3865 702/60 |
| 2023/0297729 A1* | 9/2023 | Grant | H01M 4/485 427/58 |
| 2023/0402591 A1* | 12/2023 | Wang | H01M 10/0569 |
| 2023/0402866 A1* | 12/2023 | Gao | H01M 10/44 |
| 2024/0145760 A1* | 5/2024 | Pan | H01M 4/134 |
| 2024/0154086 A1* | 5/2024 | Park | H01M 10/446 |
| 2024/0213506 A1* | 6/2024 | Lee | G01R 31/3835 |
| 2024/0283276 A1* | 8/2024 | Janek | H02J 7/0013 |
| 2024/0351888 A1* | 10/2024 | Reichmann | H01M 4/38 |
| 2025/0096336 A1* | 3/2025 | Konopka | G01R 31/392 |
| 2025/0149904 A1* | 5/2025 | Wolfram | H02J 7/0016 |
| 2025/0192246 A1* | 6/2025 | Zhang | H02J 7/007188 |
| 2025/0210718 A1* | 6/2025 | Archer | H01M 4/366 |
| 2025/0244732 A1* | 7/2025 | Casasnovas Gonzáles | H02J 7/007 |
| 2025/0266517 A1* | 8/2025 | Konopka | H01M 10/446 |

* cited by examiner

METHOD AND SYSTEM FOR CHARGING A BATTERY

INTRODUCTION

DC power sources, such as batteries, are electrochemical devices that may be employed to store and release electric power that may be employed by an electric circuit or an electric machine to perform work, such as for communications, display, or propulsion. Heat may be generated by the processes of converting electric power to chemical potential energy, i.e., battery charging, and converting chemical potential energy to electric power, i.e., battery discharging.

A lithium battery is a rechargeable electrochemical device that operates by reversibly passing lithium ions between a negative electrode (or anode) and a positive electrode (or cathode). The negative and positive electrodes are situated on opposite sides of a porous polymer separator that is soaked with an electrolyte solution suitable for conducting lithium ions. Each of the negative and positive electrodes is also accompanied by a respective current collector. The current collectors of the two electrodes are connected by an interruptible external circuit that allows an electric current to pass between the electrodes to electrically balance migration of lithium ions. Further, the negative electrode may include a lithium intercalation host material, and the positive electrode may include a lithium-based active material that can store lithium ions at a higher electric potential than the intercalation host material of the negative electrode.

Charging of a lithium battery includes supplying electric power across the positive and negative electrodes to effect migration of lithium ions. Charging of a lithium battery may induce heat generation. Heat generation may be non-uniform between cells of a lithium battery, and non-uniform within an individual cell of a lithium battery. When a temperature of a portion of a cell exceeds a threshold temperature, lithium plating may occur, wherein lithium is deposited onto a surface of an anode more rapidly than intercalation may occur. Lithium plating may reduce a charge capacity of the cell and thus reduce charge capacity of the battery and shorten its service life. Thus, charging the lithium battery outside of a threshold temperature may accelerate aging of the battery, reduce the service life of the battery, and/or reduce the energy storage capacity thereof.

A lithium battery may be more susceptible to lithium plating during charging at higher charging voltages, such as may be present during fast charging events.

SUMMARY

There is a need to rapidly charge a lithium battery while avoiding conditions that may lead lithium plating, which may otherwise accelerate aging of the battery, reduce the service life of the battery, and/or reduce the energy storage capacity thereof. Rapidly charging a lithium battery may include charging the lithium battery at an elevated voltage level in a manner that eliminates or minimizes temperature excursions above a threshold temperature to avoid or minimize lithium plating. There is a need to dynamically and accurately control one or more parameters related to charging a battery cell, or a battery cell pack containing multiple battery cells to mitigate effects of excess temperature on aging, service life, and/or energy storage capacity.

The concepts described herein include a method, apparatus, and control system for a battery charging system including a charger that is dynamically controlled during charging, including rapid charging events that include elevated voltage and/or elevated current levels. The charger is couplable to an electric power supply, and is connectable to a battery cell of a rechargeable energy storage system (RESS), An aspect of the disclosure transferring, via the charger, electric power having a charging current at a maximum charging rate to the battery cell. An anode potential offset setpoint determined. A temperature distribution in the battery cell is determined, and a cell voltage for the battery cell is monitored. A predicted anode potential offset is determined at an interface between the anode and the separator based upon the cell voltage for the battery cell. The charger is controlled via a controller to transfer the electric power to the battery cell based upon the temperature distribution in the battery cell and a difference between the anode potential offset setpoint and the predicted anode potential offset.

Another aspect of the disclosure may include the controller being a proportional-integral-derivative (PID) controller.

Another aspect of the disclosure may include controlling, via the PID controller, the charger to control one of the charging current or a charging voltage level to transfer the electric power to the battery cell based upon the temperature distribution in the battery cell and the difference between the anode potential offset setpoint and the predicted anode potential offset.

Another aspect of the disclosure may include controlling, via the controller, the charger to control the charging current to transfer the electric power to the battery cell based upon the temperature distribution in the battery cell and the difference between the anode potential offset setpoint and the predicted anode potential offset.

Another aspect of the disclosure may include controlling, via the controller, the charger to control the charging voltage level to transfer the electric power to the battery cell based upon the temperature distribution in the battery cell and the difference between the anode potential offset setpoint and the predicted anode potential offset.

Another aspect of the disclosure may include determining the temperature distribution in the battery cell via a three-dimensional (3D) non-uniform temperature distribution electrochemical battery cell model, the temperature distribution in the battery cell.

Another aspect of the disclosure may include the 3D non-uniform temperature distribution battery cell model being a 3D porous electrode model including a plurality of partial differential equations that govern chemical transport, chemical reactions, voltage, and current distribution in the battery cell.

Another aspect of the disclosure may include executing a constant voltage charging routine to transfer the electric power to the battery cell when the cell voltage achieves a maximum cell voltage.

Another aspect of the disclosure may include a method for executing fast charging of a battery cell that includes determining an anode potential offset setpoint; determining, via a three-dimensional (3D) non-uniform temperature distribution battery cell model, the temperature distribution in the battery cell; monitoring a cell voltage for the battery cell; determining a predicted anode potential offset at an interface between the anode and the separator based upon the cell voltage for the battery cell; and controlling, via a PID controller, the charger to control one of the charging current and a charging voltage level to transfer the electric power to the battery cell based upon a difference between the anode potential offset setpoint and the predicted anode potential offset, and the temperature distribution in the battery cell.

Another aspect of the disclosure may include a battery cell charging system having a charger couplable to an electric power supply, wherein the charger is connectable to a battery cell, and a controller operatively connected to the charger. The controller includes an instruction set that is executable to: transfer, via the charger, electric power from the electric power supply to the battery cell at a maximum charging rate, determine an anode potential offset setpoint, determine, via a three-dimensional (3D) non-uniform temperature distribution battery cell model, a temperature distribution in the battery cell, monitor a cell voltage for the battery cell, determine a predicted anode potential offset at an interface between the anode and the separator based upon the cell voltage for the battery cell, and control, via the controller, the charger to transfer the electric power to the battery cell based upon the temperature distribution in the battery cell and a difference between the anode potential offset setpoint and the predicted anode potential offset. Another aspect of the disclosure may the anode potential offset being a difference between a local anode solid phase potential and a potential at which lithium plating spontaneously occurs.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
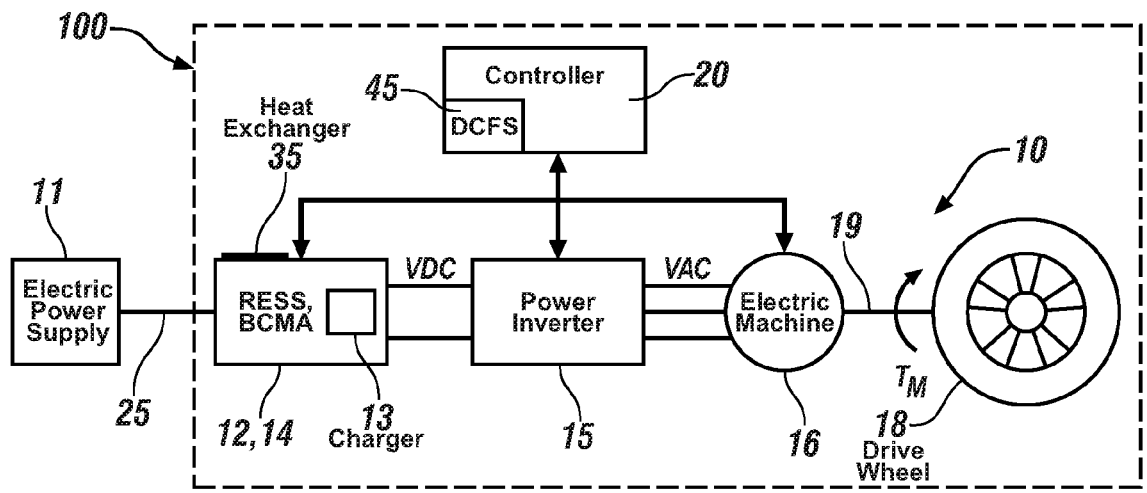
FIG. 1 schematically illustrates an electrified drivetrain for a vehicle including a rechargeable energy storage system and charging system, in accordance with the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

The following detailed description is merely exemplary in nature and is not intended to limit the application and uses. Furthermore, there is no intention to be bound by any expressed or implied theory presented herein. Throughout the drawings, corresponding reference numerals indicate like or corresponding parts and features.

Figure 2:
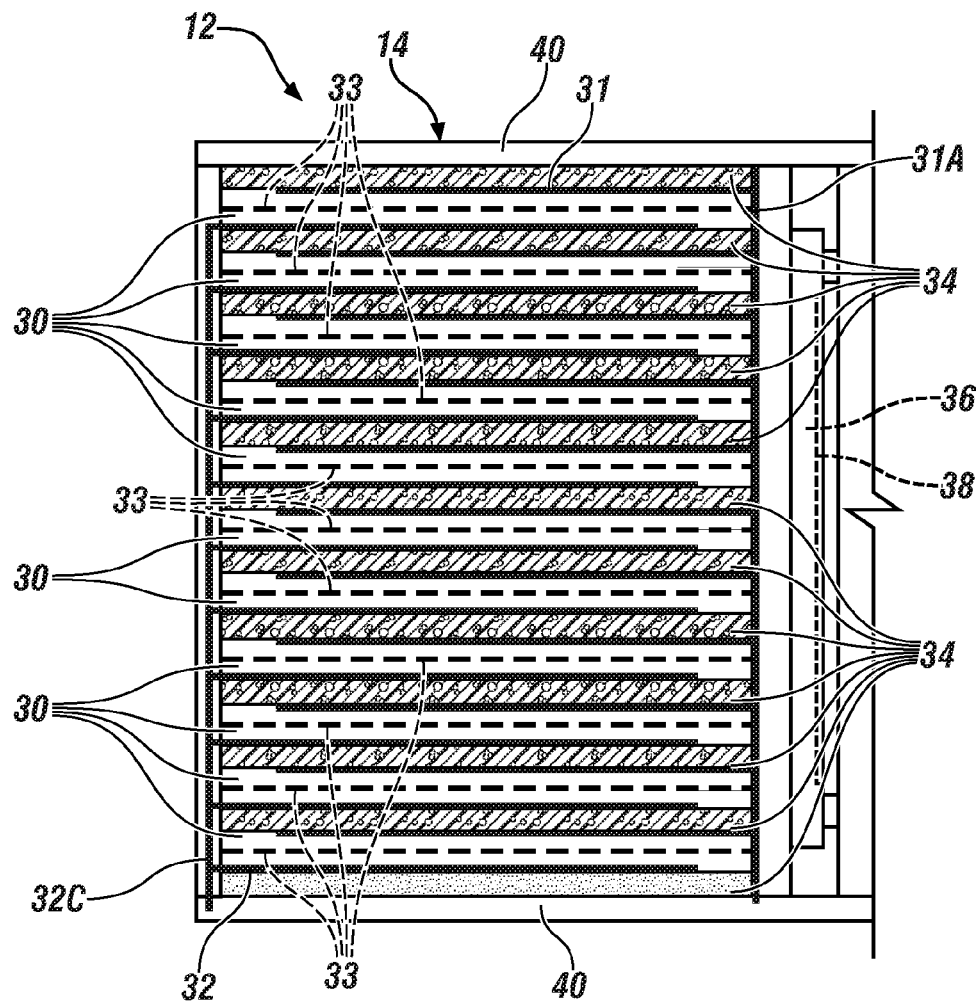
FIG. 2 schematically illustrates a battery module for a rechargeable energy storage system, in accordance with the disclosure.

Referring to the drawings, wherein like reference numerals correspond to like or similar components, FIGS. 1 and 2 schematically illustrate elements related to a vehicle 100 including an electrified drivetrain 10 and a rechargeable energy storage system (RESS) 12, which is couplable via power cord and connector 25 to an electric power supply 11 via a charger 13. The vehicle 100 may include, but is not limited to a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure.

The electric power supply 11 is coupled to an electric power source originating from a public or a private electric power supplier, and is arranged to channel electric power via the power cord and connector 25 to the RESS 12 via the charger 13 when the vehicle 100 is stationary. The electric power may be delivered at nominal voltage levels of 120 VAC, 240 VAC, 360 VAC, 480 VAC, or another voltage level without limitation. The power cord and connector 25 may be an Electric Vehicle Supply Equipment (EVSE) device, or another device, without limitation.

The electrified drivetrain 10 may an electric drivetrain that employs only electrical devices to generate tractive power, such as electric motor/generators. Alternatively, the electrified drivetrain 10 may be a hybrid electric drivetrain that employs multiple devices to generate electric power and/or tractive torque, such as an internal combustion engine or a fuel cell, for example.

As illustrated, the electrified drivetrain 10 includes the RESS 12, power inverter 15, an electric machine 16, and a drive wheel 18. The RESS 12 is electrically coupled to and provides electrical energy (VDC) to one or more power sources, such as the electric machine 16, via the power inverter 15. The electric machine 16 provides tractive torque ($T_M$) 19 to the drive wheel 18.

The RESS 12 is composed of one or a plurality of battery cell module assemblies (BCMA) 14, one of which is illustrated with reference to FIG. 2.

The RESS 12 is connected to the charger 13, which includes a charging inlet port into which the connector 25 may be plugged for purposes of charging the RESS 12 when the vehicle 100 is stationary. The charger 13 is an electric device that is controllable by a DC current fast charge (DCFC) control routine 45 that is executed by a controller 20 to manage electric power flow to the RESS 12. Details of the control routine 45 are described with reference to FIG. 5.

The controller 20 is arranged to monitor the RESS 12, the power inverter 15, and the electric machine 16.

The controller 20 also includes a non-transitory digital data storage medium on which a control routine 45 is stored in one or multiple encoded datafiles that are executable by a processor of the controller 20. An embodiment of the control routine 45 is described with reference to FIG. 2.

The controller 20 may also include control routines for monitoring and controlling operations of the power inverter 15 and the electric machine 16.

One or multiple heat exchangers 35 are in thermal contact with the RESS 12 and the inverter 15 to effect heat transfer. The heat exchangers 35 may be heat pump devices in one embodiment, such as a thermoelectric device that operates in accordance with the Peltier effect. Alternatively, the heat exchangers 35 may be an air-air heat exchanger employing a controllable fan, a dedicated coolant loop, etc.

FIG. 2 is a plan view of one of the BCMAs 14 included in the RESS 12 of FIG. 1. The BCMA 14 includes a plurality of battery cells 30. Each of the battery cells 30 is composed with an anode and anode current collector that are designated collectively as element 31, and a cathode and cathode current collector that are designated collectively as element 32. A single one of the anode and anode current collector 31 is designated, and a single one of the cathode and cathode current collector 32 is designated. The battery cells 30 may be connected in series, in parallel, or a combination thereof, via an anode interconnect board 31A and a cathode interconnect board 32C. Adjacent battery cells 30 may be stacked against one another, or may be separated by gaps or by foam 34, for example. The BCMA 14 includes a cell monitoring unit 36 that has a printed circuit board 38 (represented in phantom) configured to monitor one or more parameters of the battery cells 30. The anode and cathode interconnect boards 31A, 32C may be disposed between the plurality of battery cells 30 and the cell monitoring unit 36 and includes electronic components that physically connect the plurality of battery cells 30 with the cell monitoring unit 36 and the printed circuit board 38 thereon. Container 40 may enclose the battery cells 30 of the BCMA 14.

In one embodiment, each of the battery cells 30 is a rechargeable lithium-metal or lithium-ion (lithium) battery cell. A lithium battery generally operates by reversibly passing lithium ions between a negative electrode (or anode) and a positive electrode (or cathode). The negative and positive electrodes are situated on opposite sides of a porous polymer separator that is soaked with an electrolyte solution suitable for conducting lithium ions. Each of the negative and positive electrodes is also accommodated by a respective current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode.

During a discharge process, lithium active particles diffuse up to a surface of the cathode where they react, producing lithium ions that flow through an electrolyte solution via diffusion and migration until they arrive at the cathode. The positively charged ions react with the metal oxide material particles of the anode and diffuse within it. The electrons produced in the cathode reaction cannot flow through the electrolyte solution that acts as insulator and flow through an external circuit, producing electrical current. The inverse reactions occur during a charge process. Battery cell parameters include voltage, current, temperature, etc.

In one embodiment, the battery cells 30 are configured as rectangular prismatic devices, and each battery cell is configured as pouch-type element. Alternatively, the battery cells may be configured as cylindrical devices.

The controller 20 is arranged to monitor the RESS 12, and includes communication links to the anode collector 31 and the cathode collector 32 for monitoring parameters of the battery cells 30 of the RESS 12, communication links to the inverter 15, and communication links to the electric machine 16.

The controller 20 also includes a non-transitory digital data storage medium on which a control routine 45 is stored in one or multiple encoded datafiles that are executable by a processor of the controller 20. An embodiment of the control routine 45 is described with reference to FIG. 5.

Figure 3:
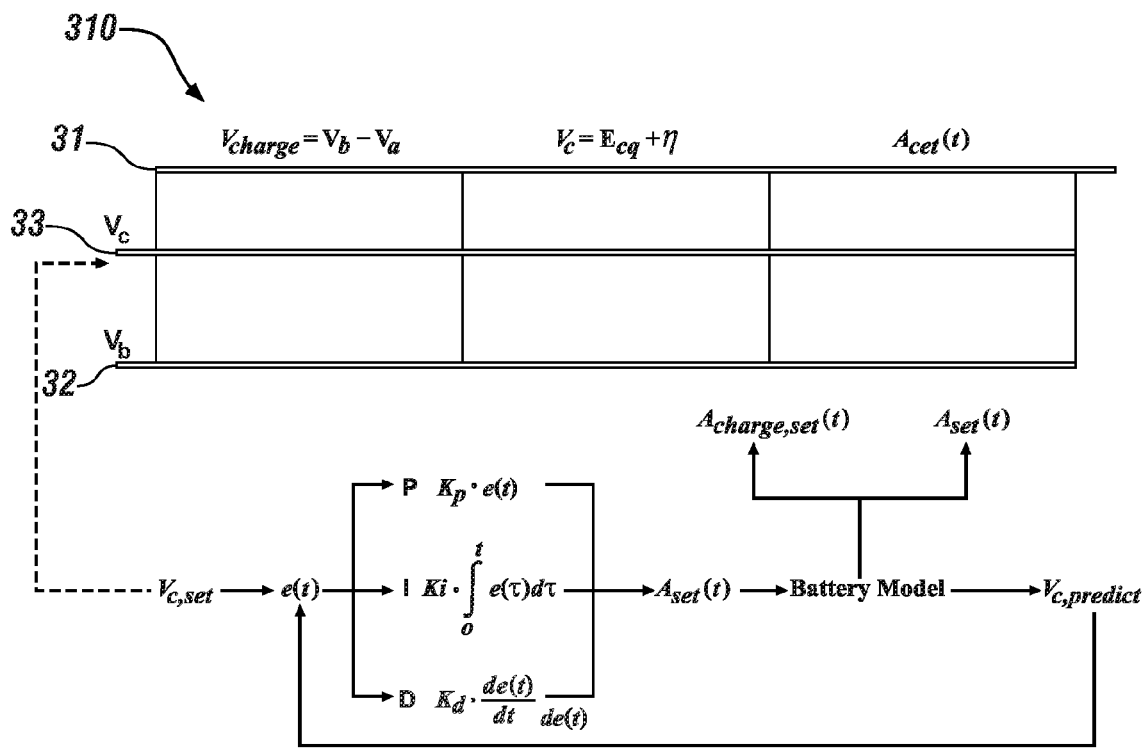
FIG. 3 schematically illustrates a cutaway side view of a single battery cell, in accordance with the disclosure.

FIG. 3 schematically illustrates a cutaway sideview of one of the battery cells 30, including the anode and anode collector 31, the cathode and cathode collector 32, and separator 33. An exemplary proportional-integral-derivative (PID) control equation 310 is also illustrated.

Electric potential at the anode collector 31 is designated Va, electric potential at the cathode collector 32 is designated Vb, and electric potential at the separator 33 is designated Vc. The electric potential (Vcharge) of the battery cell is as follows:

$$V\text{charge} = Vb - Va$$

The PID controller 310 determines e(t) from the contribution between the subtraction of the anode solid phase potential Vc and the anode potential offset setpoint Vc,set. The anode potential offset represents a difference between a local anode solid phase potential and a potential at which lithium plating spontaneously occurs, which is known or knowable. Based on the calculation of the PID controller 310, the instant PID controller fast charge current Acharge,set(t) may be derived. By comparing the PID controller fast charge current Acharge,set(t) and the input current Aset(t) in the battery model, the smaller current is used to predict the anode potential Vc,predict. The predicted anode potential Vc,predict is returned to the PID controller 310 for the next round fast charge current Acharge,set(t) calculation until it reaches the anode potential offset Vc,set.

Figure 4:
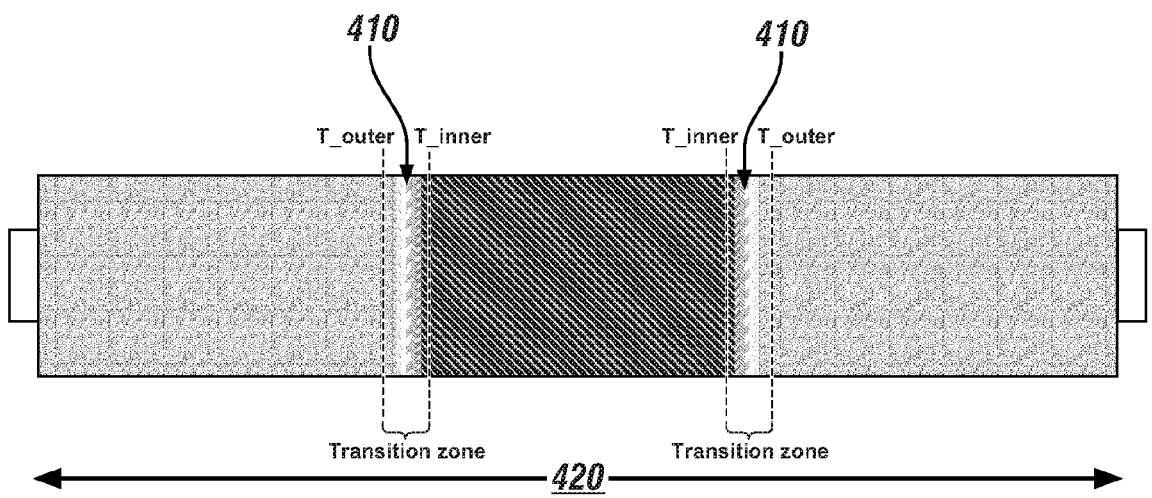
FIG. 4 schematically illustrates a cutaway side view of a single battery cell including non-uniform temperature distribution and spatial-dependent temperature transition zones along the cell length direction, in accordance with the disclosure.

FIG. 4 schematically illustrates a cutaway side view of an embodiment of a single battery cell including a non-uniform temperature distribution and spatial-dependent temperature transition zones 410 along the cell length direction 420. A non-uniform temperature distribution in the 3D porous electrode model is generated by adding the spatial-dependent temperature transition zones along the cell length direction.

Figure 5:
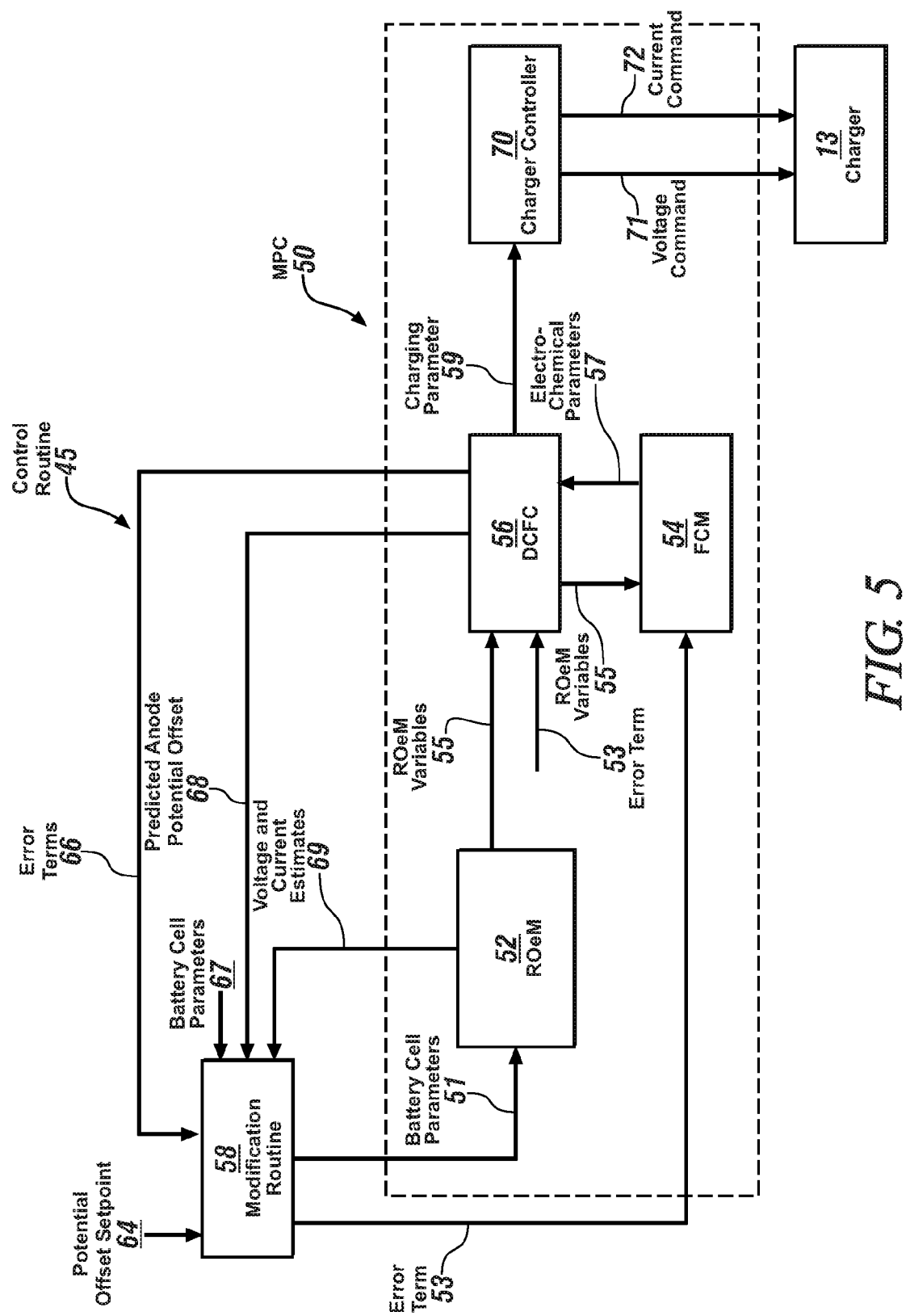
FIG. 5 schematically illustrates a DC current fast charge (DCFC) control routine for controlling a battery charger during charging of a battery cell, in accordance with the disclosure.

FIG. 5 schematically illustrates the DCFC control routine 45, which includes a three-dimensional (3D) non-uniform temperature distribution electrochemical battery cell model (FCM) 54 to estimate 3D heat generation under non-uniform temperature distribution conditions in an embodiment of one of the battery cells 30 in the RESS 12 that is described with reference to FIGS. 1 and 2. The DCFC control routine 45 employs three-electrode lithium plating concepts to avoid lithium plating at the anode of a lithium-ion battery cell, including controlling one or both of a charging current and/or a charging voltage level to transfer electric power to all of, a portion of or an individual one of battery cells 30 based upon a temperature distribution in the respective hot battery cell and a difference between the anode potential offset setpoint 64 and a predicted anode potential offset 68. The FCM 54 is a 3D porous electrode model that includes a plurality of partial differential equations that govern chemical transport, chemical reactions, voltage, and current distribution in the battery cell.

The control routine 45 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the control routine 45 is described with reference to the RESS 12 via the charger 13 when the vehicle 100 includes controller 20 shown in FIG. 1.

The control routine 45 includes a model predictive controller (MPC) 50 and a model parameter modification routine 58. The MPC 50 has a Reduced Order electrochemical Model (ROeM) 52, the FCM 54 and a DCFC controller 56. The DCFC controller 56 communicates with a charger controller 70, which is operatively and/or operatively and signally connected to the charger 13 (as shown).

Inputs to the model parameter modification routine 58 include the anode potential offset setpoint 64, error terms 66 from the DCFC controller 56, a plurality of battery cell parameters 67, the predicted anode potential offset 68, and voltage and current estimates 69 for the battery cell 30. The battery cell parameters 67 include, e.g., voltage, current, temperatures, etc.

The error terms 66 from the DCFC controller 56, the plurality of battery cell parameters 67 and other terms are input to the ROeM 52 for the battery cell, which generates ROeM variables 55 and the voltage and current estimates 69 for the battery cell 30.

The ROeM variables 55 and an error term 53 are input to the DCFC controller 56. In one embodiment, the DCFC controller 56 is a proportional-integral-derivative (PID) controller that executes PID control based upon the predicted anode potential offset 68 and the anode potential offset setpoint 64. The error term 53 is determined based upon a difference between the anode potential offset setpoint 64 and the predicted anode potential offset 68.

The DCFC controller 56 communicates the ROeM variables 55 to the FCM 54.

The FCM 54 includes the 3D non-uniform temperature distribution battery cell model, which is a 3D porous electrode model that includes a plurality of partial differential equations that govern chemical transport, chemical reactions, voltage, and current distribution in the battery cell. The plurality of partial differential equations (PDEs) are solved in a distributed fashion across the planar direction of the cell, where the potential between each mesh element is assumed to be connected in the solid phase and current collector portion via Ohm's law, and the chemical species are assumed to be connected between each mesh element via Fickian diffusion in the liquid phase of the cathode, separator, and anode. Examples of PDEs that describe 3D non-uniform temperature distribution battery cell model are known to those skilled in the art.

Inputs to the FCM 54 include the ROeM variables 55 and the error term 53, is determined based upon a difference between the anode potential offset setpoint 64 and the predicted anode potential offset 68.

The FCM 54 generates a plurality of anode electrochemical parameters 57, including predicted anode potential offset Vc,predict(t).

The anode potential offset setpoint 64 is determined, and is analogous to a three-electrode potential offset. The anode potential offset represents a difference between a local anode solid phase potential and a potential at which lithium plating spontaneously occurs, which is known or knowable. The anode potential offset setpoint 64 is calibratable, and determines how aggressive a fast charge event may occur.

The model parameter modification routine 58 is employed to determine an instant PID controller fast charge current Acharge,set(t).

The model parameter modification routine 58 may employ a Kalman filter or another form of linear quadratic estimation (LQE). The Kalman filter is an analytical construct that can be reduced to practice as an algorithm that uses a series of measurements observed over time, containing statistical noise and other inaccuracies, to produce estimates of unknown variables based upon the measurements that are observed over a period of time.

The model parameter modification routine 58 generates battery cell parameters 51 that are supplied to the ROeM 52, including a state of charge (SOC), a state of health (SOH), a cell voltage ($V_{cell}$), a cell current ($A_{cell}$), and electrochemical parameters (EC Parameters), which may be determined by regular and/or periodic monitoring of the battery cell parameters 67. The model parameter modification routine 58 also generates an error term 53 that is associated with the target parameter, i.e., the anode potential offset setpoint.

This includes managing uncertainty associated with a plurality of battery cell parameters 67 to the ROeM 52, including managing, updating and otherwise improving their accuracy employing control and feedback terms that include a anode potential offset setpoint 64 for the battery cell 30; an error term 66 associated with the target anode potential offset setpoint 64; battery cell parameters 67 including voltage, current, temperatures, etc.; anode potential estimate(s) 68 of the battery cell 30; and, voltage and current estimates 69 for the battery cell 30. The anode potential offset setpoint 64 for the battery cell 30 may be a target temperature, a target current, a target voltage, or another controllable parameter. The error term 66 is associated with the anode potential offset setpoint 64. The battery cell parameters 67 include voltage, current, temperatures, etc. The anode potential estimate(s) 68 include estimate(s) of the anode potential of the battery cell 30 between the anode and the separator, as determined by the DCFC controller 56. The voltage and current estimates 69 for the battery cell 30 are determined by the ROeM 52.

The model parameter modification routine 58 may employ a Kalman filter or another form of linear quadratic estimation (LQE). The Kalman filter is an analytical construct that can be reduced to practice as an algorithm that uses a series of measurements observed over time, containing statistical noise and other inaccuracies, to produce estimates of unknown variables based upon the measurements that are observed over a period of time.

The ROeM 52 provides a simplification of several high-fidelity, complex electrochemical source models that captures the behavior of the source models, facilitating understanding of the system's dominant effects using minimal computational resources.

The ROeM 52 includes a selection of reduced order methods for model components that are based upon physics (C1). A third-order polynomial method may be used for the liquid phase in the porous electrode, which allows use of a local concentration to calculate electrolyte diffusion and conductivity properties, rather than using an average concentration with the lower-order polynomial method. Moreover, accounting for non-uniform reaction in the porous domain may be maintained through the use of a third-order polynomial. This is important to capture the local behavior. A three-term polynomial approximation is used for the solid phase diffusion. This is suitable to capture the dynamic profile, i.e., charge/discharge/rest. A full order model may be implemented in embodiments when transient information is important. A solid phase potential is assumed constant for each electrode, which simplifies the physics without losing accuracy with the battery properties.

The ROeM 52 further includes a compilation of reduced order methods for an efficient and workable solution, tailored for control and calibration development (C2). The resulting natural system equations based on the selection methods may exist as a differential algebraic equation (DAE) system. The DAE system may be reconstructed into a system of partial differential equations (PDEs), which makes it more robust to solve by different commercial system platforms by integrating the ROeM with them.

The ROeM 52 further includes improved algorithms for robustness and real-time simulation (C3), wherein certain partial differential equations (PDEs) are linearized and solved resulting in analytical solutions, which improves robustness and enables real-time simulation through eliminating the need of an inner iteration.

The ROeM 52 determines the plurality of ROeM variables 55 based upon the plurality of battery cell parameters, which include, e.g., an open circuit voltage (OCV), reaction rate, a solid material balance, an overpotential related to phase change, etc. The internal electrochemical variables 55 are provided as inputs to the DCFC controller 56 and to the FCM 54, and also as feedback to the model parameter modification routine 58.

Examples of the plurality of the ROeM variables 55 include, by way of non-limiting examples, cathode electrical conductivity, cathode particle size, cathode film resistance, cathode anodic transfer coefficient, cathode cathodic transfer coefficient, cathode length, cathode width, cathode thickness, cathode collector thickness, cathode porosity, cathode active material volume fraction, cathode equilibrium potential, cathode particle surface concentration, cathode particle average concentration, cathode overpotential, cathode voltage drop, cathode diffusivity, cathode factor for kinetic temperature dependence (e.g., Arrhenius). Example internal ROeM variables further include, e.g., anode electrical conductivity, anode particle size, anode film resistance, anode anodic transfer coefficient, anode cathodic transfer coefficient, anode length, anode width, anode thickness, anode collector thickness, anode porosity, anode active material volume fraction, anode equilibrium potential, anode particle surface concentration, anode particle average concentration, anode overpotential, anode voltage drop, anode diffusivity, anode factor for kinetic temperature dependence (e.g., Arrhenius). Example internal ROeM variables further including, e.g., separator thickness, separator porosity, electrolyte ionic diffusivity, electrolyte ionic conductivity electrolyte salt concentration in anode domain, electrolyte salt concentration in cathode domain, electrolyte salt concentration in separator domain, full cell equilibrium potential, thermal conductivity of cell, heat capacity of cell, specific heat capacity of cell, thermal conductivity of cathode, specific heat capacity of cathode, TC of anode, SHC of anode, TC of separator, SHC of separator, terminal voltage, contact resistance at anode, contact resistance at cathode, tortuosity of anode, tortuosity of cathode, tortuosity of separator, Bruggeman coefficient for anode, Bruggeman coefficient for separator, Bruggeman coefficient for cathode, anode collector conductivity, cathode collector conductivity, capacity loss per cycle, lithium loss per cycle, lithium loss per calendar unit of time, capacity loss per calendar unit of time, resistance increase per cycle, and/or resistance increase per unit of time (also called calendar aging).

The operating temperature of the battery cell 30 strongly affects overall chemical reactions, ion transport, intercalation and deintercalation process, and consequently affects the efficiency, cycle life, and degradation of the battery cell 30.

In operation, the control routine 45 monitors the battery cell 30, and determines a plurality of battery cell parameters 67. The ROeM 52 executes to determine a plurality of ROeM variables 55 based upon the plurality of battery cell parameters 67 and the error term 53 that is associated with the anode potential offset setpoint 64. The FCM 54 determines the electrochemical model parameters 57 from the battery cell 30 based upon the plurality of ROeM variables 55 and the error term 53. The DCFC controller 56 determines a charging parameter 59 based upon the error term 53 and the plurality of ROeM variables 55. The DCFC controller 56 communicates the charging power parameter 59 to the charger controller 70, which generates a voltage command 71 and a current command 72 that are communicated to the charger 13 to control operation thereof.

As such, initially, at the start of a charging event for charging an embodiment of the RESS 12 described herein, electric power is transferred from the electric power supply 11 to the battery cells 30 of the RESS 12 via the charger 13 at a maximum charging rate, with the control routine 45 monitoring the various battery cell parameters 51. The maximum charging rate may be a maximum electric power available from the electric power supply 11, or a maximum regulated electric power.

The anode potential offset setpoint 64 is determined, along with a temperature distribution in the battery cell employing the three-dimensional (3D) non-uniform temperature distribution electrochemical battery cell model, i.e., FCM 54. A cell voltage for each of the battery cells is monitored, and a predicted anode potential offset at an interface between the anode and the separator is determined based upon the cell voltage for the battery cell. The charger 13 is controlled via the DCFC controller 56 to transfer the electric power to the battery cells 30 in response to the voltage command 71 and the current command 72, which are determined based upon the temperature distribution in the battery cell and a difference between the anode potential offset setpoint 64 and the predicted anode potential offset 68.

Figure 6:
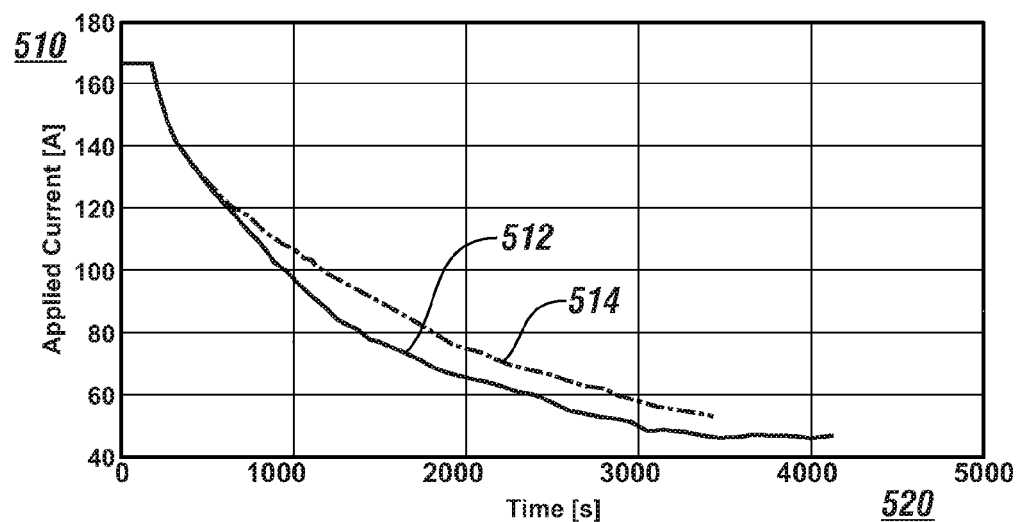
FIG. 6 graphically illustrates charging current in relation to time for a system employing an embodiment of a DC current fast charge control routine to charge a battery, in accordance with the disclosure.

FIG. 6 graphically illustrates charging current (510) in relation to time (520) for a system employing an embodiment of the DC current fast charge control routine to charge a battery, e.g., an embodiment of the RESS 12. Line 512 illustrates the charging current in relation to elapsed time employing the FCM 54 of control routine 45 as described herein. Line 514 illustrates charging current for a system employing a uniform temperature distribution model. As demonstrated, the charging current of line 512 more rapidly decreases over time, leading to less likelihood of overcharging or excess heating.

Figure 7:
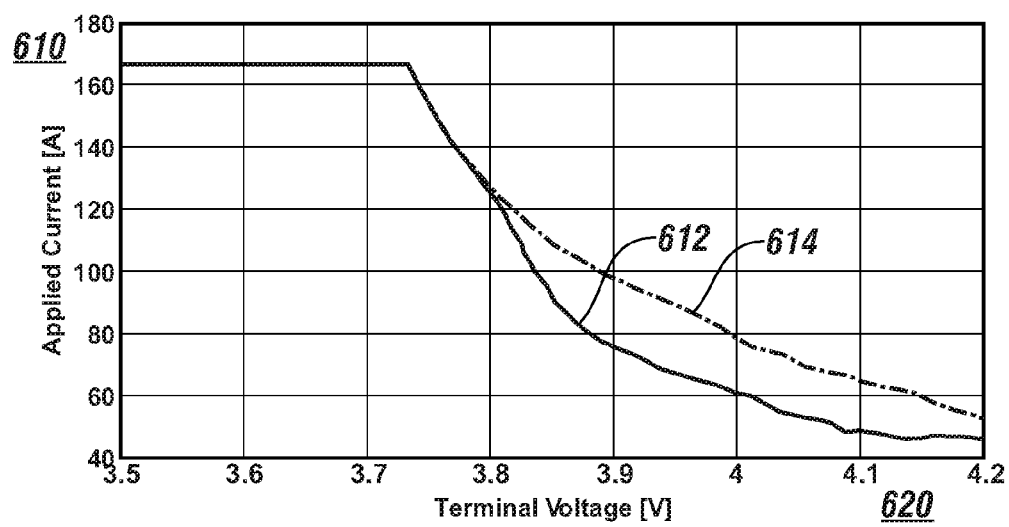
FIG. 7 graphically illustrates charging current in relation to a terminal voltage for a system employing an embodiment of a DC current fast charge control routine to charge a battery, in accordance with the disclosure.

FIG. 7 graphically illustrates charging current (610) in relation to charging voltage (620) for a system employing an embodiment of the DC current fast charge control routine to charge a battery, e.g., an embodiment of the RESS 12. Line 612 illustrates cell temperature in a system employing three-dimensional (3D) non-uniform temperature distribution electrochemical battery cell model or FCM 54 of control routine 45 as described herein. Line 614 illustrates cell temperature for a system employing a uniform temperature distribution model. As demonstrated, the charging current of line 612 shows lower value at the same voltage, leading to less capacity or lower charging time.

The concepts described herein provide the 3D non-uniform temperature electrochemical battery model combined with a software defined controller and three-electrode lithium plating concepts to avoid lithium plating at the anode of a lithium-ion battery cell to virtually estimate DCFC calibration performance and 3D heat generation in a battery cell under non-uniform temperature distribution condition. This includes generating a representative 3D porous electrode model considering the partial differential equations that govern the chemical transport, chemical reactions, voltage, and current distribution in the cell. A non-uniform temperature distribution in the 3D porous electrode model is generated by adding spatial-dependent temperature transition zones along the cell length direction; determining the non-uniform heat generation in the battery cell; and calculating the temperature distribution in time as the DC Fast Charge event progresses so that the fast charge event fully captures the benefit of increased temperature and the nuances of a particular cooling system implementation.

The software controller is a Proportional Integral Derivative (PID) type to control the cell level voltage and applied current to meet a control setpoint based upon desired terminal voltage. The setpoint is defined as an anode potential offset, analogous to a three-electrode potential offset. A maximum charging current is applied to the battery cell, and the cell voltage is monitored to predict the anode potential at the interface between anode and separator. The PID controller is used to modify the cell voltage and charging current to follow the anode potential setpoint, ensuring that the effect of the non-uniform temperature on the local minimum anode potential is captured. The anode active material solid phase concentration is periodically checked to ensure that it does not approach lithium plating criteria. When the maximum cell voltage is reached, the PID controller switches to a constant voltage charging scheme.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The term "parameter" refers to a measurable quantity that represents a physical property of a device or other element that is discernible using one or more sensors and/or a physical model. A parameter can have a discrete value, e.g., either "1" or "0", or can be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. A method for executing fast charging of a battery cell of a rechargeable energy storage system (RESS), the method comprising:
    transferring, via a charger, electric power having a charging current at a maximum charging rate to the battery cell, wherein the battery cell includes an anode and a separator;
    determining an anode potential offset setpoint;
    determining a temperature distribution in the battery cell;
    monitoring a cell voltage for the battery cell;
    determining a predicted anode potential offset at an interface between the anode and the separator based upon the cell voltage for the battery cell; and
    controlling, via a controller, the charger to transfer the electric power to the battery cell based upon the temperature distribution in the battery cell and a difference between the anode potential offset setpoint and the predicted anode potential offset.

2. The method of claim 1, wherein the controller comprises a proportional-integral-derivative (PID) controller.

3. The method of claim 2, comprising controlling, via the PID controller, the charger to control one of the charging current or a charging voltage level to transfer the electric power to the battery cell based upon the temperature distribution in the battery cell and the difference between the anode potential offset setpoint and the predicted anode potential offset.

4. The method of claim 1, comprising controlling, via the controller, the charger to control the charging current to transfer the electric power to the battery cell based upon the temperature distribution in the battery cell and the difference between the anode potential offset setpoint and the predicted anode potential offset.

5. The method of claim 1, comprising controlling, via the controller, the charger to control a charging voltage level to transfer the electric power to the battery cell based upon the temperature distribution in the battery cell and the difference between the anode potential offset setpoint and the predicted anode potential offset.

6. The method of claim 1, wherein determining the temperature distribution in the battery cell comprises determining, via a three-dimensional (3D) non-uniform temperature distribution electrochemical battery cell model, the temperature distribution in the battery cell in time, as the electric power is transferred thereto.

7. The method of claim 6, wherein the 3D non-uniform temperature distribution battery cell model comprises a 3D porous electrode model including a plurality of partial differential equations that govern chemical transport, chemical reactions, voltage, and current distribution in the battery cell.

8. The method of claim 1, further comprising executing a constant voltage charging routine to transfer the electric power to the battery cell when the cell voltage achieves a maximum cell voltage.

9. A method for executing fast charging of a battery cell having an anode and a separator, the method comprising:
    determining an anode potential offset setpoint;
    determining the temperature distribution in the battery cell;
    monitoring a cell voltage for the battery cell;
    determining a predicted anode potential offset at an interface between the anode and the separator based upon the cell voltage for the battery cell; and
    controlling, via a PID controller, a charger to control one of a charging current and a charging voltage level to transfer electric power to the battery cell based upon a difference between the anode potential offset setpoint and the predicted anode potential offset, and the temperature distribution in the battery cell.

10. The method of claim 9, further comprising executing a constant voltage charging routine to transfer electric power to the battery cell when the cell voltage achieves a maximum cell voltage.

11. The method of claim 9, wherein determining the temperature distribution in the battery cell comprises determining, via a three-dimensional (3D) non-uniform temperature distribution battery cell model, the temperature distribution in the battery cell in time, as the electrical power is transferred thereto.

12. The method of claim 11, wherein the 3D non-uniform temperature distribution battery cell model comprises a 3D porous electrode model including a plurality of partial differential equations that govern chemical transport, chemical reactions, voltage, and current distribution in the battery cell.

13. A battery cell charging system, comprising:
    a charger couplable to an electric power supply, wherein the charger is connectable to a battery cell having an anode and a separator;
    a controller operatively connected to the charger, the controller including an instruction set, the instruction set being executable to:
    transfer, via the charger, electric power from the electric power supply to the battery cell at a maximum charging rate;
    determine an anode potential offset setpoint;
    determine a temperature distribution in the battery cell;
    monitor a cell voltage for the battery cell;
    determine a predicted anode potential offset at an interface between the anode and the separator based upon the cell voltage for the battery cell; and
    control, via the controller, the charger to transfer the electric power to the battery cell based upon the temperature distribution in the battery cell and a difference between the anode potential offset setpoint and the predicted anode potential offset.

14. The system of claim 13, comprising the instruction set being executable to control, via a PID controller, the charger to control one of a charging current or a charging voltage level of the battery cell to transfer the electric power to the battery cell based upon the temperature distribution in the battery cell and the difference between the anode potential offset setpoint and the predicted anode potential offset.

15. The system of claim 13, wherein determining the temperature distribution in the battery cell comprises determining, via a three-dimensional (3D) non-uniform temperature distribution battery cell model, the temperature distribution in the battery cell in time, as the electric power is transferred thereto.

16. The system of claim 15, wherein the 3D non-uniform temperature distribution battery cell model comprises a 3D porous electrode model including a plurality of partial differential equations that govern chemical transport, chemical reactions, voltage, and current distribution in the battery cell.

17. The system of claim 13, wherein the battery cell comprises a rechargeable lithium battery cell.

18. The system of claim 13, wherein the battery cell comprises a plurality of battery cells that are electrically connected.

19. The system of claim 13, further comprising a rechargeable energy storage system (RESS), wherein the battery cell is an element of the RESS.

20. The system of claim 13, wherein the anode potential offset comprises a difference between the local anode solid phase potential and a potential at which lithium plating spontaneously occurs.

* * * * *